(12) United States Patent
Heikkinen et al.

(10) Patent No.: US 12,539,020 B2
(45) Date of Patent: Feb. 3, 2026

(54) HOLOGRAPHIC DIGITIZER ILLUMINATOR WITH MUTUALLY VARIANT WAVELENGTHS

(71) Applicant: D4D Technologies, LLC, Richardson, TX (US)

(72) Inventors: Juuso Jalmari Heikkinen, Vancouver (CA); MyeongSoo Kim, Vancouver (CA)

(73) Assignee: D4D Technologies, LLC, Richardson, TX (US)

( * ) Notice: Subject to any disclaimer, the term of this patent is extended or adjusted under 35 U.S.C. 154(b) by 349 days.

(21) Appl. No.: 18/455,027

(22) Filed: Aug. 24, 2023

(65) Prior Publication Data

US 2025/0068125 A1   Feb. 27, 2025

(51) Int. Cl.
*A61B 1/00* (2006.01)
*A61B 1/06* (2006.01)
*A61B 1/24* (2006.01)
*G03H 1/22* (2006.01)

(52) U.S. Cl.
CPC .......... *A61B 1/00194* (2022.02); *A61B 1/063* (2013.01); *A61B 1/0684* (2013.01);
(Continued)

(58) Field of Classification Search
CPC ... A61B 1/00194; A61B 1/063; A61B 1/0684; A61B 1/24; A61B 1/00172;
(Continued)

(56) References Cited

U.S. PATENT DOCUMENTS 4,333,006 A * 6/1982 Gorin .................. G02B 26/106
                                               235/462.34
5,088,823 A * 2/1992 Smith, Jr. ............. G01J 3/1809
                                               356/334
(Continued)

OTHER PUBLICATIONS

Hack et.al. 1998—"Additive-subtractive two-wavelength ESPI contouring by using a synthetic wavelength phase shift" Applied Optics, vol. 37, issue 13, p. 2591-2597 (1998) https://doi.org/10.1364/AO.37.002591.
(Continued)

*Primary Examiner* — Tony Ko
(74) *Attorney, Agent, or Firm* — Scheef & Stone, LLP

(57) ABSTRACT

Systems and methods for generating multiple mutually variant wavelengths of coherent radiation for three-dimensional imaging of a physical object, such as a tooth, are disclosed. A single radiation source, such as a laser diode, emits coherent electromagnetic radiation. A highly dispersive optical element, such as an echelle diffraction grating, separates radiation having specific wavelengths from the emitted spectrum into distinct beams. Optical components, such as optical masks, mirrors, and lenses, select and orient desired beams to illuminate the object. Small changes in drive current or heatsink temperature of the radiation source similarly affect all wavelengths of the emitted spectrum, so the relative wavelength differences of the desired beams of radiation remain constant. This wavelength stability is useful for synthetic wavelength generation for digital holography and minimizes errors in object shape profile measurements at various scales. Use of a single radiation source also reduces system cost and complexity.

28 Claims, 12 Drawing Sheets

(52) U.S. Cl.
CPC ............. *A61B 1/24* (2013.01); *G03H 1/2205* (2013.01); *G03H 1/2286* (2013.01); *G03H 1/2294* (2013.01); *G03H 2223/23* (2013.01)

(58) Field of Classification Search
CPC .. A61B 1/0638; G03H 1/2205; G03H 1/2286; G03H 1/2294; G03H 2223/23; G03H 1/0465; G03H 2001/266; G03H 2222/13
See application file for complete search history.

(56) References Cited

U.S. PATENT DOCUMENTS

| | | |
|---|---|---|
| 5,719,672 A * | 2/1998 | Chien .................... G01J 3/189 356/328 |
| 6,809,845 B1 | 10/2004 | Kim et al. |
| 7,342,668 B2 | 3/2008 | Quadling et al. |
| 7,978,892 B2 | 7/2011 | Quadling et al. |
| 8,068,235 B1 | 11/2011 | Marron et al. |

OTHER PUBLICATIONS

Kühn et al. 2007—"Real-time dual-wavelength digital holographic microscopy with a single hologram acquisition" Optics Express, vol. 15, issue 32, p. 7231-7242 (2007) https://doi.org/10.1364/OE.15.007231.

Mann et al. 2008—"Quantitative phase imaging by three-wavelength digital holography" Optics Express, vol. 16, issue 13, p. 9753-9764 (2008) https://doi.org/10.1364/OE.16.009753.

\* cited by examiner

FIG. 3

NUMERICAL VALUES OF MULTI-WAVELENGTH MEASUREMENT RANGES

300

| $\lambda_0$ (nm) | $\Delta\lambda$ (nm) | $\lambda_{BW}$ (nm) | SELECTED MODES | | | | SYNTHETIC WAVELENGTH (mm) | | | | MEASUREMENT RANGE (5% NOISE LEVEL) |
|---|---|---|---|---|---|---|---|---|---|---|---|
| | | | i | j | k | l | $\Lambda_{ij}$ | $\Lambda_{kl}$ | $\Lambda_{jk}$ | $\Lambda_{ijkl}$ | |
| 450 | 0.055 | 2 | 0 | 17 | 18 | 35 | 0.11 | 0.22 | 3.70 | 49.54 | |
| | | | | | | | 0.0026 | 0.0054 | 0.0924 | 1.24 | MIN (mm) |
| | | | | | | | 0.0528 | 0.1090 | 1.85 | 24.77 | MAX (mm) |
| | | | | | | | 1 | 2 | 3 | 4 | SCALE NO. |

HOLOGRAPHIC DIGITIZER ILLUMINATOR WITH MUTUALLY VARIANT WAVELENGTHS

TECHNICAL FIELD

This disclosure relates generally to optical scanning devices.

BACKGROUND

It is known to provide an intra-oral scanner to enable a user to scan a dental patient to create a digital impression of the patient's dental anatomy. In some instances, the scanner may record a hologram of at least one of the patient's teeth. The hologram may record high-precision three-dimensional shape data to be used for various dental treatments.

In general, holography involves illuminating a physical object with a coherent beam of electromagnetic radiation, typically but not exclusively using visible light. Radiation reflected from the object interacts with a superimposed coherent reference beam to produce an interference pattern that is then recorded by an imaging sensor. The sensor is often digital, such as a charge-coupled device (CCD), leading to the term "digital holography."

The interference pattern contains phase information describing the shape of the object. A hologram is thus a recording of an interference pattern that can reproduce a three-dimensional light field via diffraction. A hologram can be used to measure surface features with great precision, but the maximum effective depth range of the imaged object is only approximately half the wavelength of radiation used. Since this range is often too small to yield useful data with macroscopic physical objects using visible light, different holographic techniques have been used to extend the measurement depth range.

One such known holographic technique is Wavelength Multiplexing Digital Holography, in which multiple wavelengths of radiation are used to create a set of "synthetic" wavelengths that are used to measure object shape profiles at several different scales. For example, if a physical object is illuminated by one laser having a wavelength $\lambda i$, the recorded hologram has phase $\phi i = 4\pi * \Delta z / \lambda i$, where $\Delta z$ is the depth range. If the object is instead illuminated by two lasers having wavelengths $\lambda i$ and $\lambda j$, the resulting phase maps may be subtracted to yield $\phi i - \phi j = 4\pi * \Delta z (1/\lambda i - 1/\lambda j) = 4\pi * \Delta z / \Lambda ij$, where $\Lambda ij$ is the effective synthetic wavelength $1/(1/\lambda i - 1/\lambda j)$. Thus, if two illuminating lasers have very similar output wavelengths, the effective synthetic wavelength may be significantly larger than either wavelength, i.e., $\Lambda ij = (\lambda i * \lambda j)/(\lambda j - \lambda i) >> \lambda i$.

Multiple wavelengths may be used to holographically image an object simultaneously. The recorded image thus contains phase data that may be combined to yield data corresponding to multiple synthetic wavelengths, each capable of spanning a given measurement depth range. This technique thus achieves a wider overall composite measurement depth range while preserving high depth precision in each different synthetic wavelength's depth range. However, a key requirement is that the emitted wavelengths must be very stable, as even small fluctuations in the relative wavelengths can lead to highly amplified variations in the synthetic wavelengths, creating large measurement errors.

Use of multiple different laser sources to separately generate each of the required laser wavelengths has previously been a common practice for this technique. The different-illuminator approach offers convenient adjustment of each of the wavelengths, but each wavelength fluctuates or varies at its own pace because each laser is driven by its own driver circuit. Thus, the drive current and the heatsink temperature for each laser must be very carefully controlled to minimize the relative wavelength variances.

Other existing solutions have attempted to increase the wavelength stability by integrating many different laser sources onto the same heatsink. This approach causes the output wavelengths to become partially correlated, so the variations in the resulting synthetic wavelengths are reduced. Unfortunately, using multiple laser sources increases system complexity. Further, high-stability lasers and laser controllers are expensive.

BRIEF SUMMARY

In one embodiment, an apparatus for illuminating a physical object for holographic imaging comprises a single radiation source that emits a spectrum of coherent radiation, a dispersive element that disperses the spectrum into a plurality of different wavelengths, a selection element that selects a plurality of the beams, and a direction element that directs the selected beams toward the physical object and generates corresponding reference beams, wherein all the beams are mutually variant.

In one embodiment, a method of illuminating a physical object for holographic imaging comprises emitting a spectrum of coherent radiation with a single radiation source, dispersing the emitted spectrum into a plurality of beams of different wavelengths, selecting a plurality of the beams, and directing the selected beams toward the physical object and generating corresponding reference beams, wherein all the beams are mutually variant.

In one embodiment, a system for illuminating a physical object for holographic imaging comprises means for emitting a spectrum of coherent radiation with a single radiation source, means for dispersing the emitted spectrum into a plurality of beams of different wavelengths, means for selecting a plurality of the beams, and means for directing the selected beams toward the physical object and generating corresponding reference beams, wherein all the beams are mutually variant.

One embodiment described herein uses a single laser diode as a multi-wavelength coherent radiation source. Most laser diodes naturally operate in multi-longitudinal mode (MLM), and thus their output spectra comprise multiple finely and evenly spaced wavelength components. Some of those wavelength components may be selected by spreading and passively filtering the output of the laser diode.

Multi-longitudinal mode behavior is typically considered a disadvantage because it reduces the coherence length of a laser source. Significant effort has thus been made in the prior art to reduce the laser linewidth by optimizing drive current and temperature, as well as using active feedback mechanisms to generate a single-longitudinal mode output. This disclosure goes directly against this trend and instead advantageously utilizes the high spectral width and systematic mode structure of MLM laser diodes.

Longitudinal laser modes are very closely spaced, with mode spacings typically on the order of 50 to 100 picometers. As a result, even some commercial optical spectrum analyzers cannot resolve their individual peaks. Thus, a highly dispersive optical element is needed to spatially separate the different wavelengths, to allow filtering and practical access of the filtered single-wavelength output beams for individual use.

In one embodiment, an echelle-type diffraction grating (EDG) serves this purpose, followed by a long focal length focusing lens. EDGs are much less widely used than traditional diffraction gratings, which are generally insufficient in dispersion and resolution for adequately separating the adjacent laser modes. Use of an EDG enables individual laser wavelengths to be physically separated by several hundreds of micrometers or more, so that simple optical masks, lenses, and mirrors may filter and redirect radiation as needed.

One relative advantage of the approach of this disclosure is that only one unmodified and often low-cost laser diode radiation source is needed. All the radiation used for holography is emitted from the same source operating at a given drive current and temperature, and thus all the resulting wavelengths are highly correlated. If the laser source undergoes variations in drive current or temperature, all of the wavelengths emitted will drift substantially equally. The relative wavelength differences however, and thus the synthetic wavelengths used for object surface analysis, remain virtually unchanged in spite of any such variations. For purposes of this disclosure, the term "mutually variant" refers specifically to the relative wavelength difference between two selected radiation beams remaining substantially constant, in spite of variations in drive current and temperature of the coherent radiation source.

Further, the radiation source instrumentation cost is advantageously relatively low since only one ordinary laser diode is needed. The laser diode needs no pulse control circuitry as it may typically operate continuously. Echelle-type diffraction gratings are also widely available.

In operation, the multiple distinct object beams of selected wavelengths that scatter from an illuminated physical object are combined with multiple corresponding reference beams at a digital photodetector, such as a CCD or CMOS sensor. The sensor records a digital image that comprises multiple multiplexed holograms, each with a unique phase map. The captured image is processed by choosing different object beam wavelength pairs to generate different synthetic wavelengths for analysis.

The captured image thus provides three-dimensional physical object measurement data over multiple different depth scales that, taken together, cover the desired depth range. In one embodiment, the paths of illumination and observation by the sensor are substantially co-axial, to avoid shadowing issues. However, each reference beam may arrive at the sensor at a unique angle.

The foregoing description has outlined some of the more pertinent features of the subject matter. These features should be construed to be merely illustrative.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document. For a more complete understanding of the disclosed subject matter and the advantages thereof, reference is now made to the following descriptions taken in conjunction with the accompanying drawings, in which:

FIG. 3 depicts a chart 300 of various modes and wavelengths selected for holographic use according to this disclosure;

DETAILED DESCRIPTION OF THE EMBODIMENTS

Figure 1:
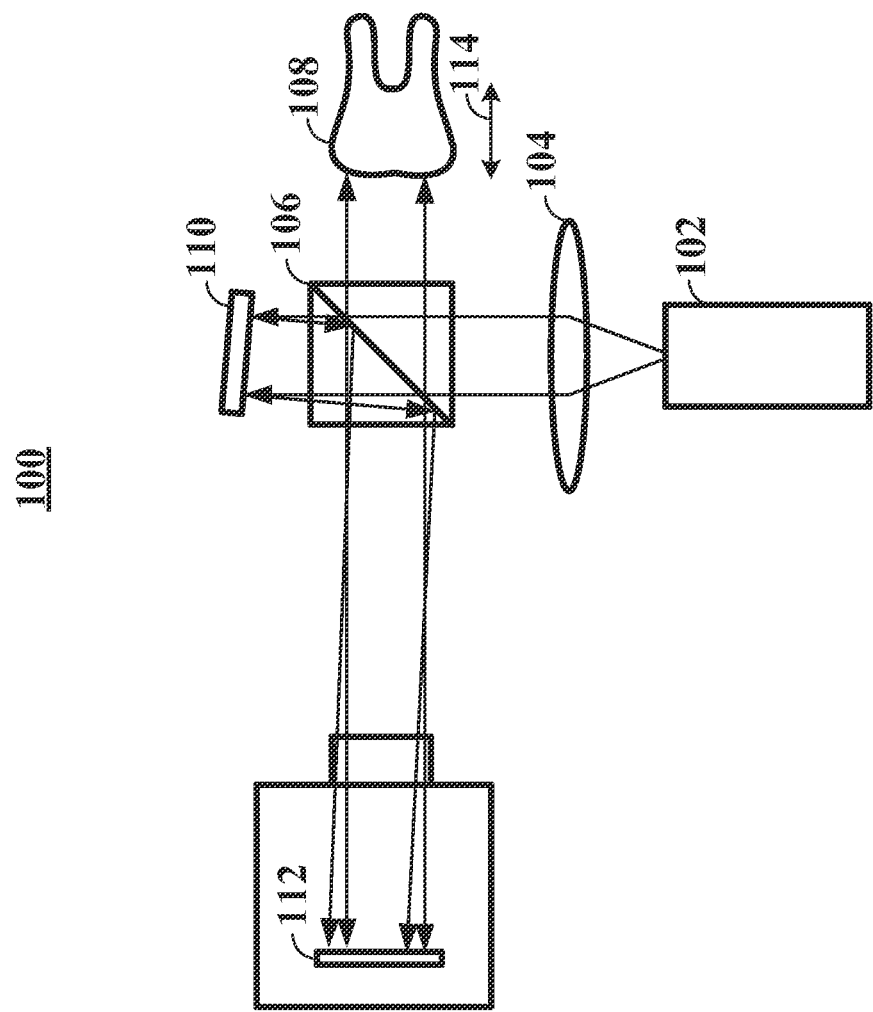
FIG. 1 depicts a basic view of an embodiment of a conventional holographic imaging system 100.

FIG. 1 depicts a basic view of an embodiment of a conventional holographic imaging system 100. Radiation source 102 emits coherent radiation, which for purposes of initial simplified explanation may be assumed to comprise only a single wavelength of light. Collimating lens 104 delivers the light into a beamsplitter 106, illustrated here as a cube type, although other types of beamsplitters are known in the art. Beamsplitter 106 reflects some of the incoming radiation toward a physical object 108, shown here as an exemplary but non-limiting tooth, being imaged. Beamsplitter 106 also transmits some of the incoming radiation toward a mirror 110, which is typically slightly tilted. Radiation reflecting from mirror 110 forms a reference beam that is partly reflected toward an imaging sensor 112. Historically, film cameras were used as imaging sensors, but digital devices such as high resolution CMOS cameras or CCDs are increasingly used today. Some of the radiation reflecting from physical object 108 also travels through beamsplitter 106 to arrive at imaging sensor 112.

The radiation that arrives at imaging sensor 112 thus comprises radiation from an object beam that was reflected from physical object 108 and a reference beam that was reflected from tilted mirror 110. Imaging sensor 112 records the intensity of the incoming radiation, which varies according to the superposition of the arriving wavefronts to form an interference pattern. The slight tilting of mirror 110 helps ensure a discernible phase difference exists between different wavefronts arriving via similar paths. The captured pattern of intensities encodes information regarding the three-dimensional nature of physical object 108.

A depth imaging range 114 of the physical object may be determined by the wavelength of radiation used, as previously mentioned, and a level of tolerable noise. The end result is that precise depth data may be recorded by a conventional holographic system, but only for a depth range comparable to about half of the wavelength of radiation used. For macroscopic objects illuminated by visible light, this depth range may be insufficient for some intended uses, such as producing a precise three-dimensional model of a physical object that includes more than just a very thin layer of its upper surface.

Figure 2:
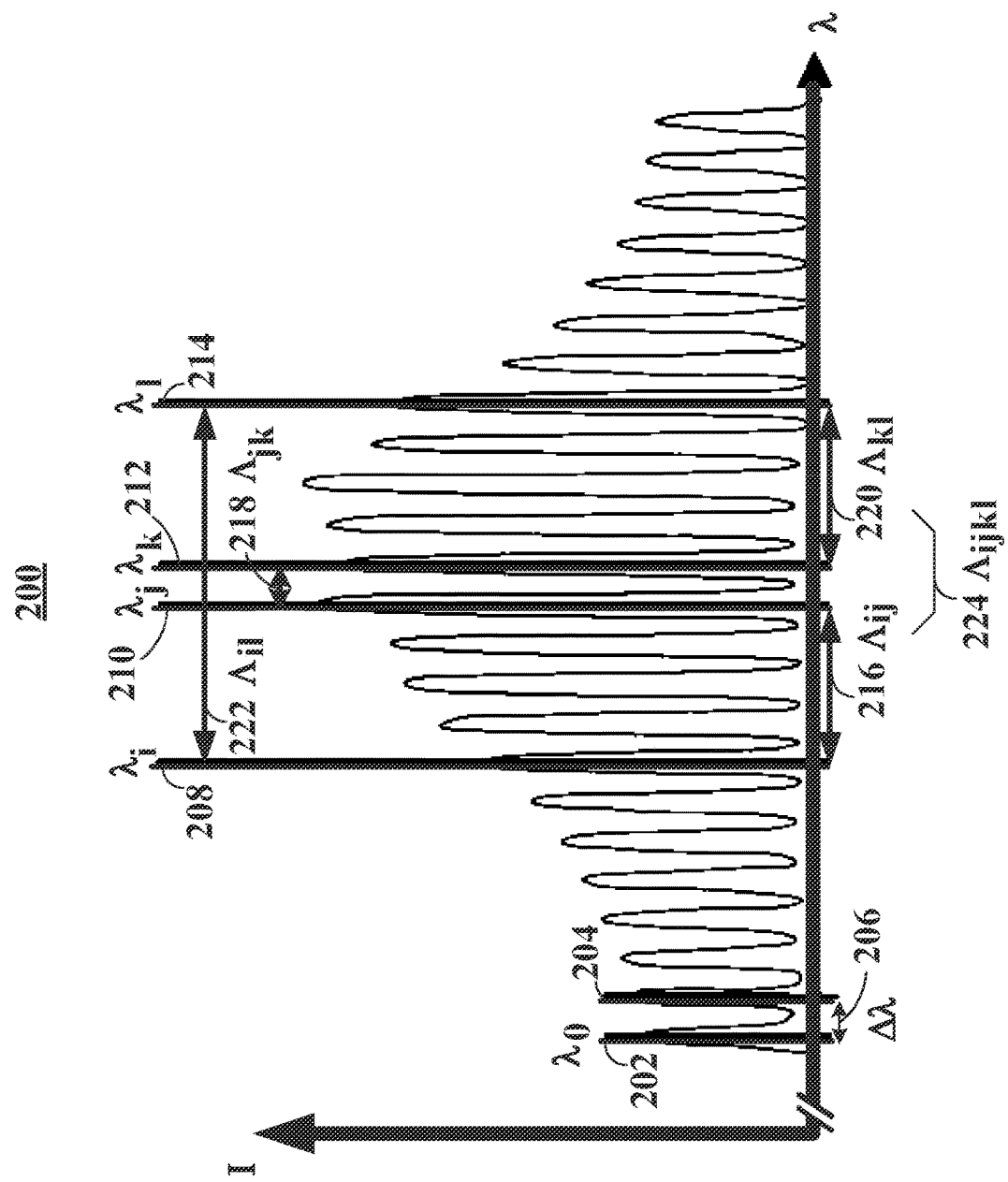
FIG. 2 depicts a typical MLM laser diode output spectrum 200 according to this disclosure.

FIG. 2 depicts a typical MLM laser diode output spectrum 200 according to this disclosure. Unlike the hypothetical single-wavelength coherent radiation output previously described for FIG. 1, a MLM laser diode actually emits spectrum 200 comprising radiation of many different wavelengths. The lowest wavelength 202 may represent the hypothetical single-wavelength output with wavelength $\lambda_0$, for example. Many other spectral components having closely-spaced wavelengths are also shown, however. For example, the next highest-wavelength component 204 is separated from wavelength 202 by a distance $\Delta\lambda$ 206, which for visible light may be only a few picometers. Each component of the overall output spectrum 200 may have varying intensity levels, which it will be recognized may not match the levels of exemplary spectrum 200 shown here.

Different specific wavelengths of coherent radiation in emitted MLM spectrum 200 may be of particular interest and utility for purposes to be described herein. For example, wavelength $\lambda i$ denoted here as item 208 may result from a particular mode that is a specific number of discrete wavelength-spacings distant from the lowest wavelength 202 (e.g., seven, as shown in this Figure). Wavelengths $\lambda j$, $\lambda k$, and $\lambda l$, denoted here as items 210, 212, and 214, are also of course various discrete numbers of wavelength-spacings apart.

Emitted radiation of particular wavelengths may be used to synthesize different wavelengths in a Wavelength Multiplexing Digital Holography system, as previously mentioned. Wavelengths $\lambda i$ and $\lambda j$ for example may synthesize wavelength $\Lambda ij$ 216, which may be far larger than either component wavelength (i.e., the depiction of the synthesized wavelengths in this figure merely indicates the wavelengths used as inputs, not the potentially far larger resulting synthesized wavelengths).

Wavelengths $\lambda j$ and $\lambda k$ for example may synthesize wavelength $\Lambda jk$ 218 and wavelengths $\lambda i$ and $\lambda l$ for example may synthesize wavelength $\Lambda il$ 222. FIG. 2 thus denotes pairs of actual wavelengths that may be used for wavelength synthesis. Further, two synthesized wavelengths may themselves be used for further wavelength synthesis, as in the case of $\Lambda ijkl$ 224, which results from inputs $\Lambda ij$ 216 and $\Lambda kl$ 220. Each synthesized wavelength may allow imaging with a particular depth range. Use of multiple synthesized wavelengths can thus yield data allowing composite imaging of a higher depth range.

FIG. 3 depicts a chart 300 of various modes and wavelengths selected for Wavelength Multiplexing Digital Holography use according to this disclosure. The objective, in this example, is to image a tooth over a depth range of 16 millimeters with a precision of five microns. The MLM laser chosen has a base wavelength of 450 nanometers, with a mode spacing of 0.055 nanometers. Approximately two nanometers of total wavelength variation is available, corresponding to around 36 different modes in the emitted spectrum. Four wavelengths, designated i, j, k, and l are chosen for use in wavelength synthesis in this non-limiting example. In this case, mode i is the base wavelength of 450 nanometers, so i=0. Mode numbers 17 and 18 are chosen for wavelengths j and k, respectively, and mode number 35 is chosen for wavelength l.

Four synthetic wavelengths are used in this example, $\Lambda il$, $\Lambda kl$, $\Lambda jk$, and $\Lambda ijkl$, which have values of 0.11 millimeters, 0.22 millimeters, 3.70 millimeters, and 49.54 millimeters, respectively. Note that these synthetic wavelengths are far larger than the input wavelengths from which they are synthesized (e.g., millimeters versus nanometers).

At a five percent noise level, this approach yields four different depth scales over which imaging data may be clearly discerned. For example, $\Lambda il$ can image items over a depth range of 2.6 microns to 52.8 microns, while $\Lambda kl$ can image items over a depth of 5.4 microns to 109 microns. Synthesized wavelength $\Lambda jk$ can span a depth range of 92.4 microns to 1850 microns, and wavelength $\Lambda ijkl$ can cover 1240 microns to 24770 microns. Taken together, these four synthesized wavelengths can thus produce acceptably focused image data from 2.6 microns to 24770 microns, a far greater range than would be possible without wavelength synthesis. Other wavelengths and other numbers of wavelengths and synthesized wavelengths may also be employed.

Figure 4:
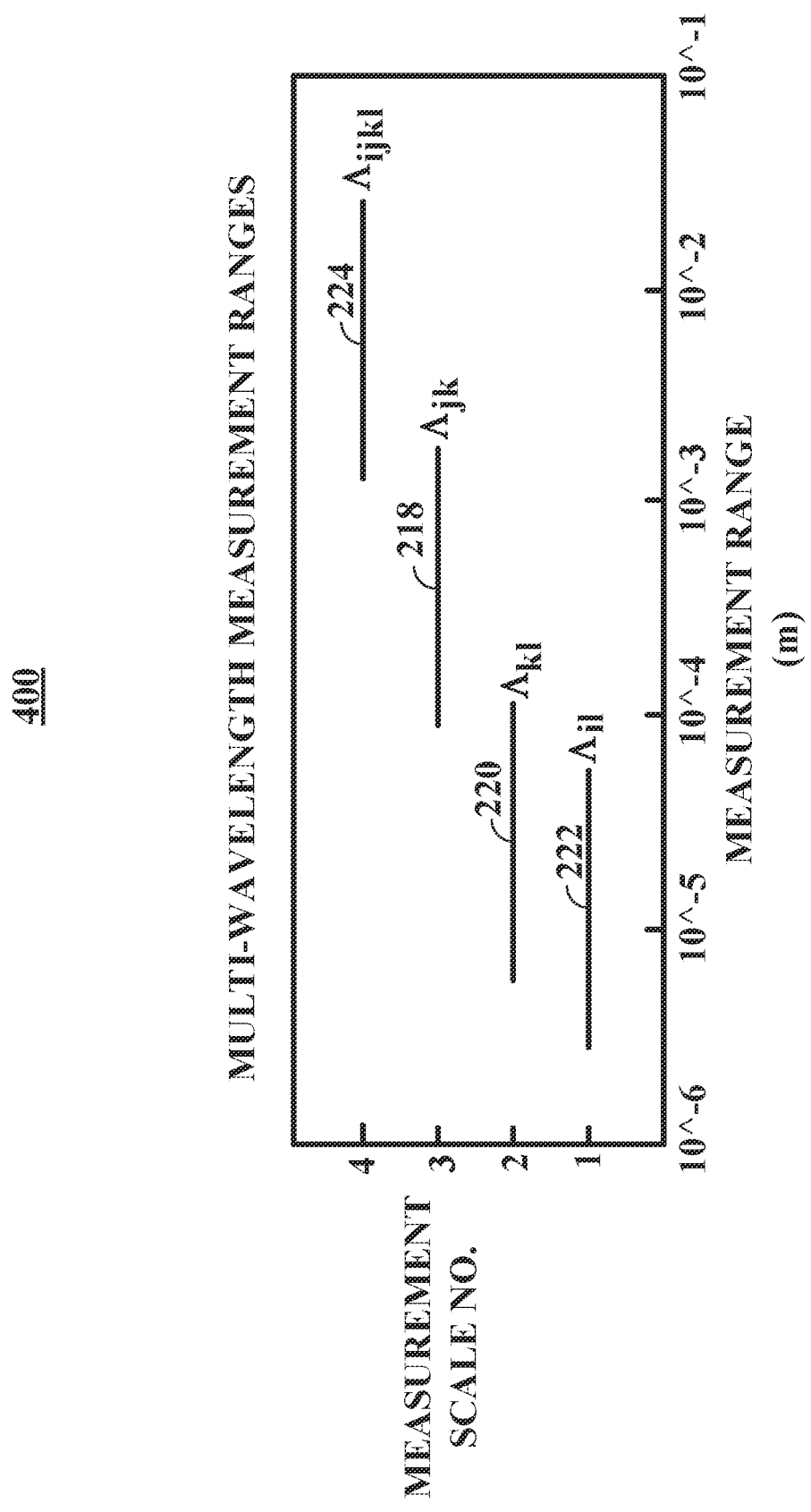
FIG. 4 depicts a diagram 400 of the measurement distance ranges available using a selected set of synthesized wavelengths according to this disclosure.

FIG. 4 depicts a diagram 400 of the measurement distance ranges available using a selected set of synthesized wavelengths according to this disclosure. This diagram graphically depicts the data provided by FIG. 3. For macroscopic physical objects 108, like a tooth, a depth range of nearly one inch is possible using these synthetic wavelengths. Such a depth range is the result of using four object beams of different wavelengths carefully selected from MLM laser diode spectrum 200. The best laser modes will not only have the desired wavelength relationships, but will also have sufficiently high intensities.

The laser diode source is preferably driven by a driver circuit that very carefully regulates the laser current. The laser diode is also preferably attached to a significant heat sink and/or thermoelectric cooler to help provide a constant operating temperature. Tight control of driving current and temperature helps minimize wavelength drift. Any wavelength variation that does occur affects all of the selected modes substantially identically, so the relative wavelength variation between the selected modes is essentially zero. Thus, in terms of this disclosure, the wavelengths are said to be mutually variant. This feature in turn helps ensure that the synthesized wavelengths remain substantially constant.

In one embodiment, the laser source comprises a single-longitudinal mode laser instead of the MLM laser previously described. One might expect that a single-longitudinal mode laser would emit only radiation of a single wavelength, but in fact some unexpectedly do emit a small number of modes. In some instances, single-longitudinal mode lasers may thus prove adequate for use in wavelength synthesis as previously described, and so are within the scope of this disclosure.

Figure 5:
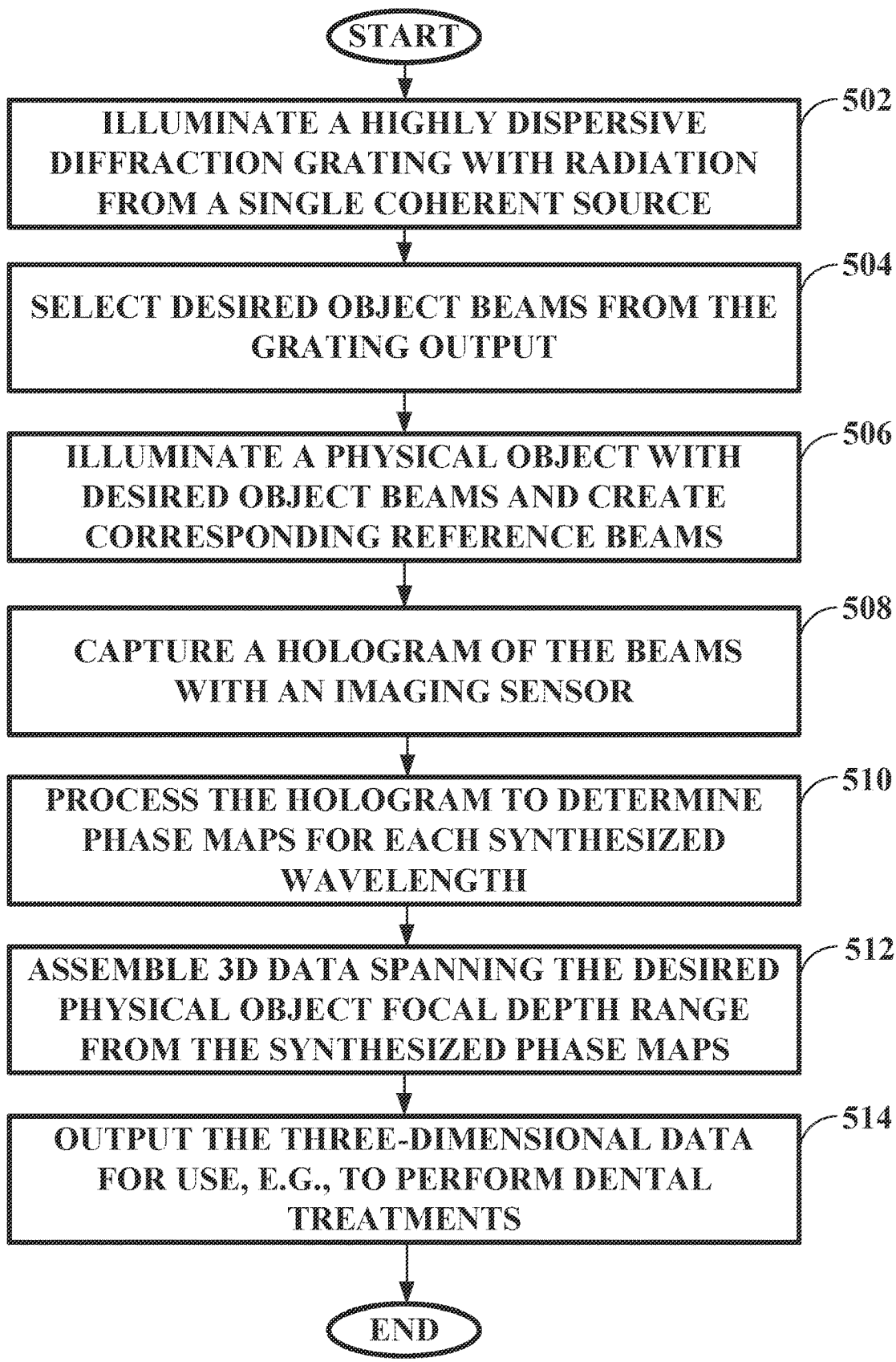
FIG. 5 depicts a flowchart 500 describing the operation of the holographic system in which the techniques of this disclosure may be implemented.

FIG. 5 depicts a flowchart 500 describing the operation of the holographic system in which the techniques of this disclosure may be implemented. First, at 502, a highly dispersive diffraction grating, such as an EDG, is illuminated with radiation from a single coherent source. In one embodiment, the source is a single MLM laser diode. Next, at 504, the system may select desired object beam modes and corresponding wavelengths from the output of the EDG. As previously mentioned, the wavelength variation of each beam is minimized by careful control of the laser current and temperature, such that the relative variation between the different selected wavelengths is substantially eliminated.

Then, at 506, the desired object beams illuminate the physical object to be imaged, and are also used to create corresponding reference beams, which may be tilted slightly. At 508, an imaging sensor captures a hologram of the incoming beams. That is, the interaction of object beam wavefronts and reference beam wavefronts yields an interference pattern that is recorded.

At 510, the system processes the hologram to determine the phase maps for each synthesized wavelength. At 512, the system may assemble three-dimensional data points spanning the desired depth range for the physical object from the synthesized beam phase maps. Finally, at 514, the system may output the three-dimensional data for use in controlling subsequent processes. In one embodiment, the three-dimensional data may be used for various dental treatments, such as the precise machining of crowns, implants, or other dental appliances.

Figure 6:
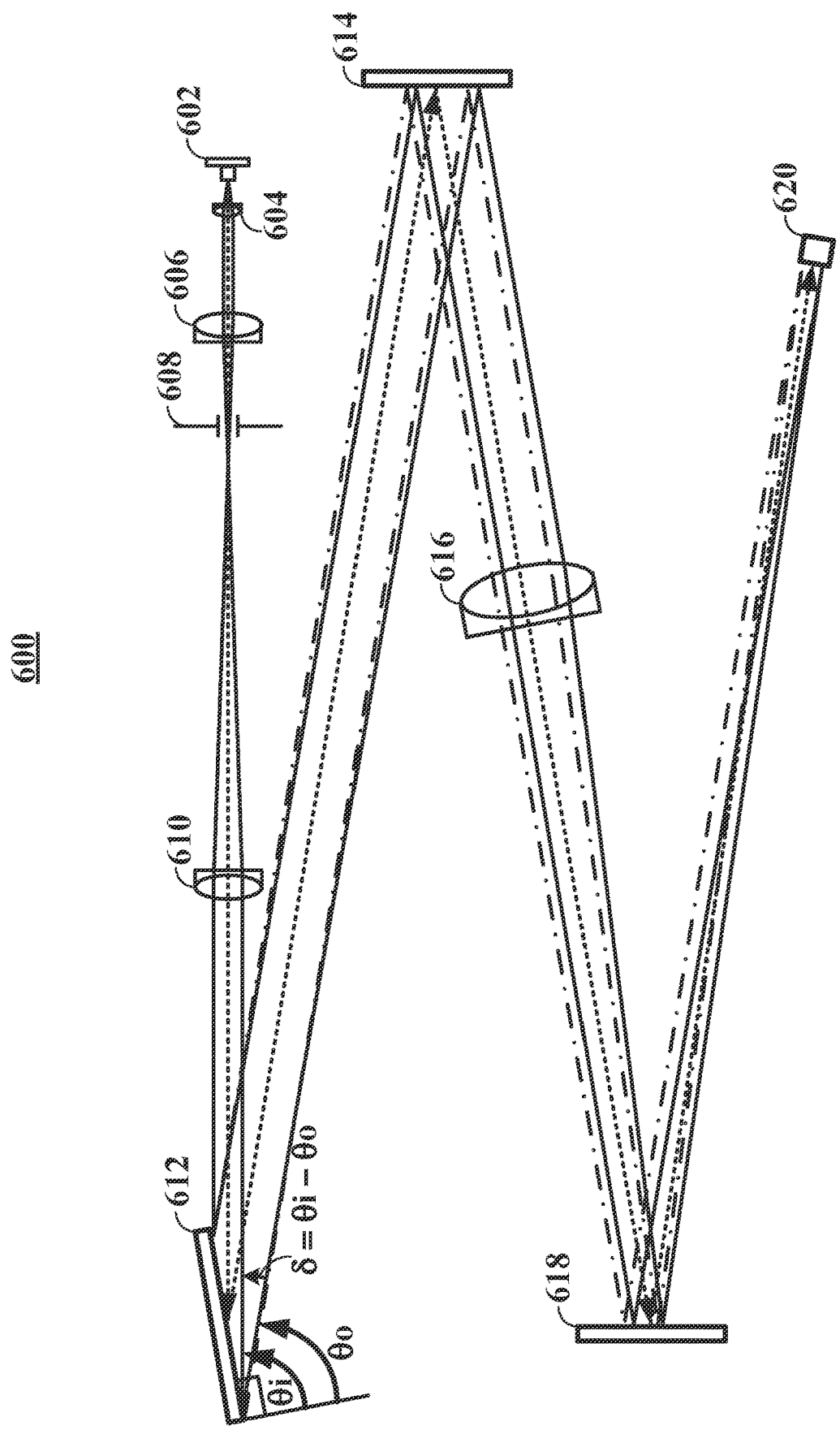
FIG. 6 depicts an embodiment of a holographic illuminator 600 according to this disclosure.

FIG. 6 depicts an embodiment of a holographic illuminator 600 according to this disclosure. A single coherent radiation source 602 emits a spectrum to be processed. In one embodiment, the source 602 is a single MLM laser diode. The diverging output of the source 602 is collimated by an achromatic lens 604.

In this design, the distances between the optical components have been set according to the common 4f principle, though this is an exemplary and non-limiting design practice. Thus, spacings of one focal length are used on either side of each lens to a subsequent optical component (which would also include its own focal-length spacings). Other designs may not necessarily follow this principle.

A second lens 606 then focuses the collimated beam through an optical pinhole or aperture 608 to spatially filter the beam. The spatially filtered and cleaned beam is then collimated by a third lens 610 and proceeds to an EDG 612. The incidence angle is set according to the grating specifications to minimize deviation from the Littrow configuration, to maximize diffraction efficiency.

EDG 612, or other highly dispersive element, diffracts incoming radiation into several diffraction orders. The orders with the highest brightness are preferably selected, in one example, and are directed to a long focal length lens 616 that focuses the diffracted beam toward the lens back focal plane 620. The optical path is folded in this example via the use of two mirrors 614 and 618.

In one embodiment, laser diode source 602 emitted blue light of approximately 450 nanometers wavelength with a mode spacing of 55 picometers and an overall node bandwidth of two nanometers. EDG 612 of this embodiment was 50 millimeters wide and 25 millimeters high, had 79 lines/millimeter, and a blaze angle of 75 degrees. The diffracted beams were focused by an achromatic doublet lens of 1000 millimeters focal length.

The goal of this system was to cover a depth range of five microns to 16 millimeters, as previously described, which is typical for a holographic tooth scanning scenario. Violet light of approximately 405 nanometers has also been used successfully. Violet light is particularly advantageous for surface imaging as it does not penetrate the surface of a tooth as much as longer wavelengths of radiation, so less volume scattering occurs.

Figure 7:
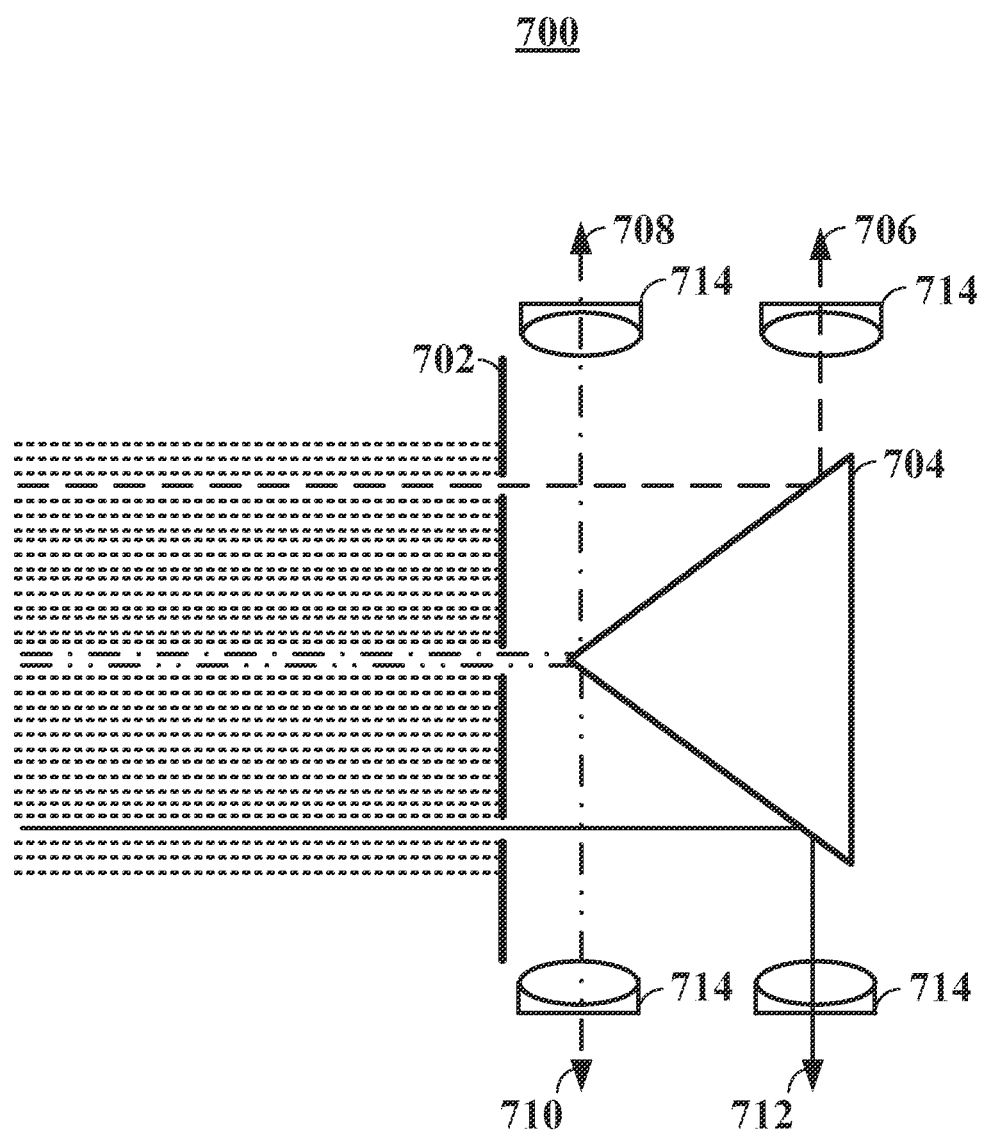
FIG. 7 depicts an embodiment of a portion 700 of the holographic illuminator 600 including mode selection and fiber coupling features according to this disclosure.

FIG. 7 depicts an embodiment of a portion 700 of the holographic illuminator 600 including mode selection and fiber coupling features according to this disclosure. Generally, at the lens back focal plane 620, a series of bright dots will appear during operation of illuminator 600, where each dot corresponds to an independent laser wavelength. An optical mask 702 positioned at back focal plane 620 has pinholes or apertures that are precisely sized and laterally separated to select the particular desired wavelengths of radiation. The other incoming wavelengths of radiation are blocked or filtered out, i.e., not selected. Optical mask 702 may comprise anodized aluminum.

In this example, four desired wavelengths (e.g., beams 706, 708, 710, and 712) are selected. These filtered laser beams may then be steered to different locations by a knife-edge prism 704 and coupled into single-mode fibers using a number of achromatic lenses 714, which may be identical in one embodiment. In another embodiment, a D-shaped pickup mirror (not shown) may replace knife-edge prism 704 to serve the same purpose as the prism.

Illuminator 600 (sometimes called a "laser box") apparatus described thus provides a plurality of focused and filtered radiation beams of specific selected wavelengths for use in synthetic wavelength holography. Coupling of the radiation beams to optical fibers facilitates the separation of illuminator 600 from an intra-oral wand (sometimes more generally called a "scanning head"). The scanning head is designed to be convenient for use by dental personnel when treating patients, or more generally by other personnel when scanning any various physical objects 108 of interest.

While fiber coupling provides benefits, variations in beam wavelength could cause difficulties in coupling the beam to its corresponding optical fiber. The core of a typical single-mode optical fiber is only a few microns in diameter, so even a small wavelength shift could cause the beam to "fall off" the fiber. Precise stabilization of both laser current and temperature is thus needed to minimize this risk.

Figure 8:
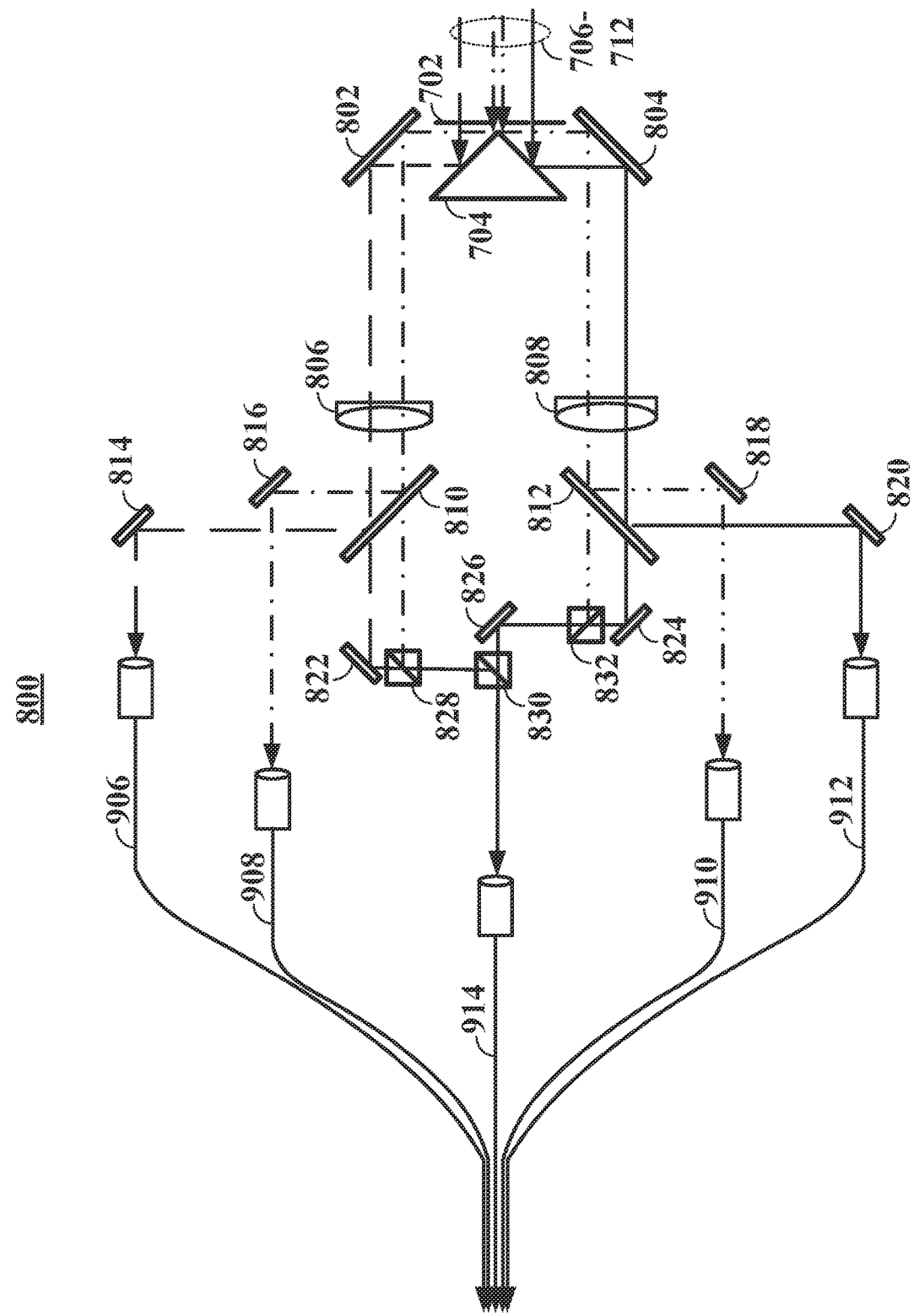
FIG. 8 depicts an embodiment of a fiber coupling apparatus 800 according to this disclosure.

FIG. 8 depicts an embodiment of a fiber coupling apparatus 800 according to this disclosure. In this example, four separate beams of radiation may be combined, but in other embodiments a greater or smaller number of beams may be combined. Generally, a number of mirrors, lenses, and beamsplitters of various types may precisely reflect four exemplary incoming beams 706, 708, 710, and 712 into separate corresponding optical fibers 906, 908, 910, and 912, and into an additional fiber 914 that receives at least portions of all of the incoming beams. Such a design may enable convenient separate adjustment of each beam to the central core of each optical fiber, to prevent a beam from falling off the optical fiber as previously described.

Radiation beams emerging from knife-edge prism 704 of FIG. 7 may, in this embodiment, be directly pair-wise transferred to a pair of mirrors 802 and 804. Two lenses 806 and 808 may then collimate each beam pair and transmit them to two beamsplitters 810 and 812. Note that each beam remains physically separated due to optical mask 702 and reflective interaction with knife-edge prism 704.

Radiation from each beamsplitter 810 and 812 then proceeds down two general routes in this embodiment. Portions of the beams propagate to separate mirrors 814, 816, 818, and 820 for reflection into optical fibers 906, 908, 910, and 912 that each carry one beam. These optical fibers 906, 908, 910, and 912 may carry each beam for use as reference beams in a scanning head, for example.

Other portions of the beams proceed to other mirrors 822, 824, and 826 and cube-type beamsplitters 828, 830, and 832 that transfer that radiation into the single optical fiber 914 that carries a spectrum comprising all of the selected wavelengths. Optical fiber 914 may carry this composite beam for use as an object beam in a scanning head, for example.

Figure 9:
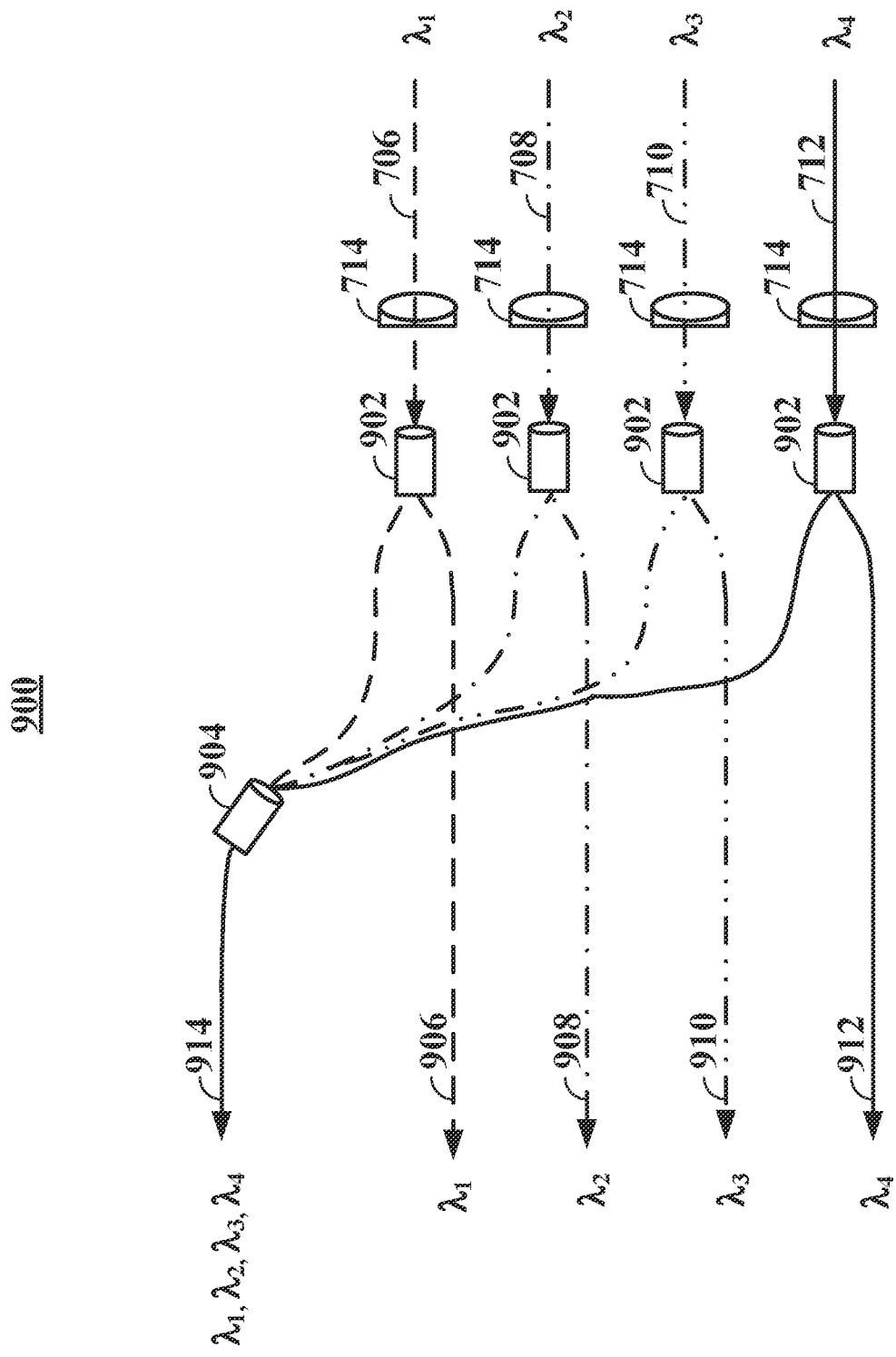
FIG. 9 depicts another embodiment of a fiber coupling apparatus 900 according to this disclosure.

FIG. 9 depicts another embodiment of a fiber coupling apparatus 900 according to this disclosure. Beams 706, 708, 710, and 712 are collimated by lenses 714 as previously shown in FIG. 7. Each beam of radiation arrives at its own beamsplitter/coupler 902, which may be identical and which each have two optical fibers at their respective outputs in this example. Each respective incoming beam is then split by its respective beamsplitter/coupler 902, to propagate along both of two corresponding optical fibers.

For each respective radiation beam, at least one optical fiber carrying only that beam may exit the fiber coupling apparatus 900 to, for example, later be connected to a scanning head. Thus, optical fibers 906, 908, 910, and 912 as shown each propagate corresponding input beams 706, 708, 710, and 712, respectively. These optical fibers may carry each beam for use as reference beams in a scanning head, for example.

Each of the second fibers emerging from beamsplitter/couplers 902 are connected to a four-way coupler 904 in this embodiment. The output from four-way coupler 904 is thus a composite beam having all of the input beams (e.g., 706, 708, 710, and 712) as spectral components. The composite beam may propagate via an optical fiber 914. Optical fiber 914 may carry the composite beam for use as an object beam in a scanning head, for example. Other types of fiber coupling apparatus as may be known in the art are also within the scope of this disclosure.

Figure 10:
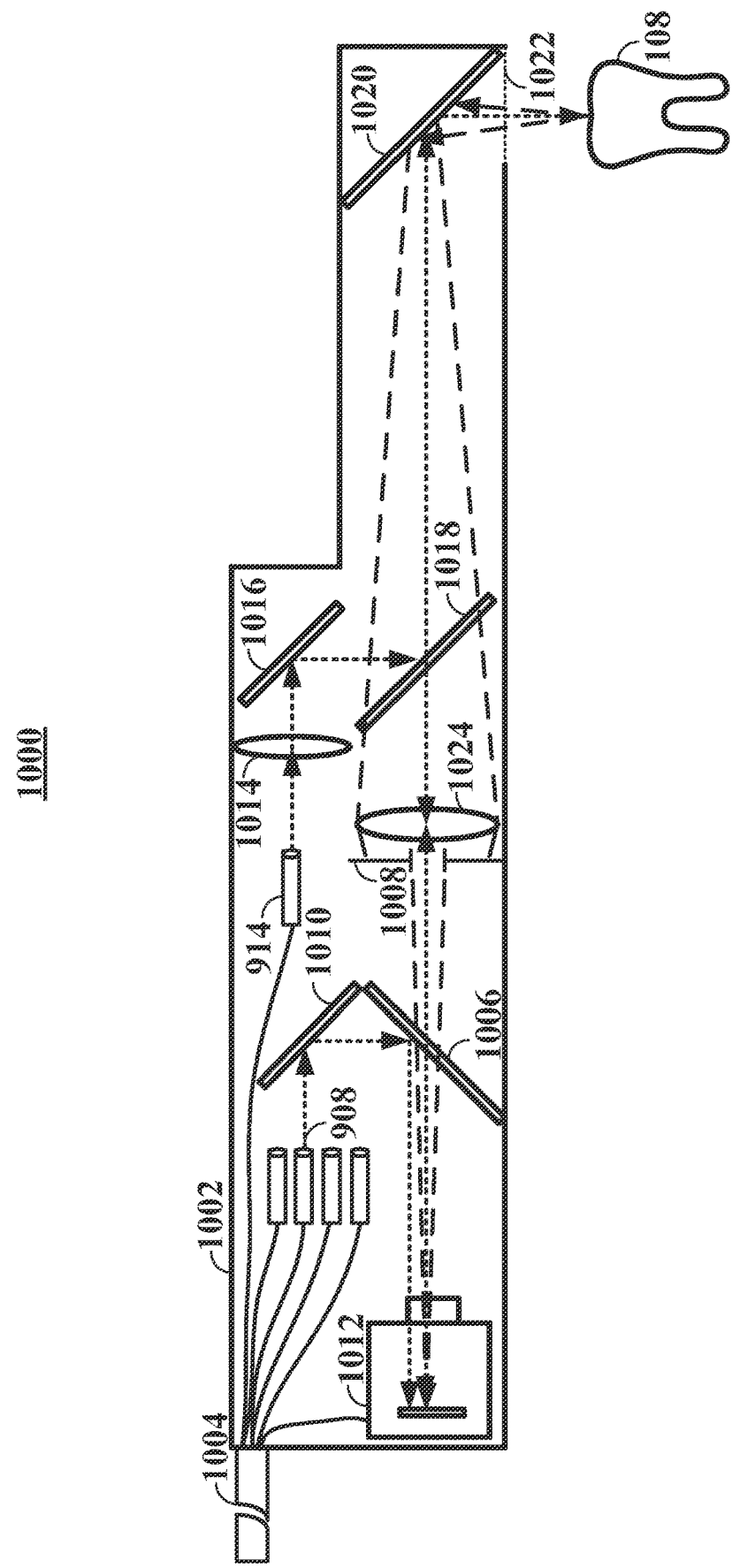
FIG. 10 depicts a first embodiment of a scanning head 1000 of an intra-oral scanner according to this disclosure.

FIG. 10 depicts a first embodiment 1000 of the scanning head of an intra-oral scanner according to this disclosure. A housing 1002 contains the various functional components of the scanning head in a shape that is generally both physically robust and convenient for manipulation by an operator. For example, housing 1002 features an input/output adapter 1004 that provides mechanically secure electrical connections for power and data signals, and optical fiber connections for receiving illumination from the illuminator 600. Optical fibers are typically centered within a metal or plastic or ceramic ferrule for mechanical stability, and are shown as such throughout this disclosure. Housing 1002 further comprises a substantially transparent window 1022, through which radiation may be emitted and also received after scattering from physical object 108 being illuminated.

Housing 1002 may be designed to allow intra-oral scanning of a patient in a dental office, for example. In one non-limiting embodiment, physical object 108 being observed comprises at least one tooth of a dental patient. The patient may be a human or a non-human animal. Other physical objects 108 to be scanned are also within the scope of this disclosure, such as dental appliances like crowns and fillings, etc., as may be known in the art, or any non-dental item as well.

Optical fibers 906, 908, 910, 912, and 914 provide illumination from illuminator 600 as previously described (though fibers 906, 910, and 912 are un-numbered here for clarity). Radiation from optical fibers 906, 908, 910, and 912 impinges upon a first mirror 1010, which directs it downward in this design. Radiation from optical fiber 914 passes through a first lens 1014 and then impinges upon a second mirror 1016, which also directs it downward in this design.

In an alternative embodiment, the optical fibers 906, 908, 910, 912, and 914, or any subset thereof, may instead enter perpendicularly to the top of the housing 1002. In this alternative embodiment, first mirror 1010 and second mirror 1016 may be advantageously omitted.

Reference beams carried by optical fibers 906, 908, 910, and 912 in this example impinge on a first beamsplitter 1006, which reflects them toward an imaging sensor 1012. Imaging sensor 1012 may receive electrical power and produce output data signals that may be carried out of housing 1002 via input/output adapter 1004. Imaging sensor 1012 may comprise a digital imaging sensor of requisite resolution, speed, and sensitivity, as may be familiar to those in the art.

The object beam carried by the optical fiber 914 in this example impinges on a second beamsplitter 1018. Second beamsplitter 1018 reflects part of the object beam toward a third mirror 1020, which reflects it toward physical object 108 through the window 1022. The focal length of first lens 1014 may not match the path length of the object beam to physical object 108, i.e., this design is not a 4f system.

Radiation scattered from physical object 108 returns through window 1022 and is reflected by third mirror 1020 through second beamsplitter 1018 to a second lens 1024. Radiation from second lens 1024 is then filtered by an aperture 1008 and proceeds through first beamsplitter 1006 to imaging sensor 1012. The focal length of second lens 1024 may not match the path length of the scattered radiation nor the distance from second lens 1024 to imaging sensor 1012, i.e., again this design is not a 4f system. The focal lengths and optical path distances of this design are weighed against considerations regarding the convenient length of scanner head housing 1002.

Figure 11:
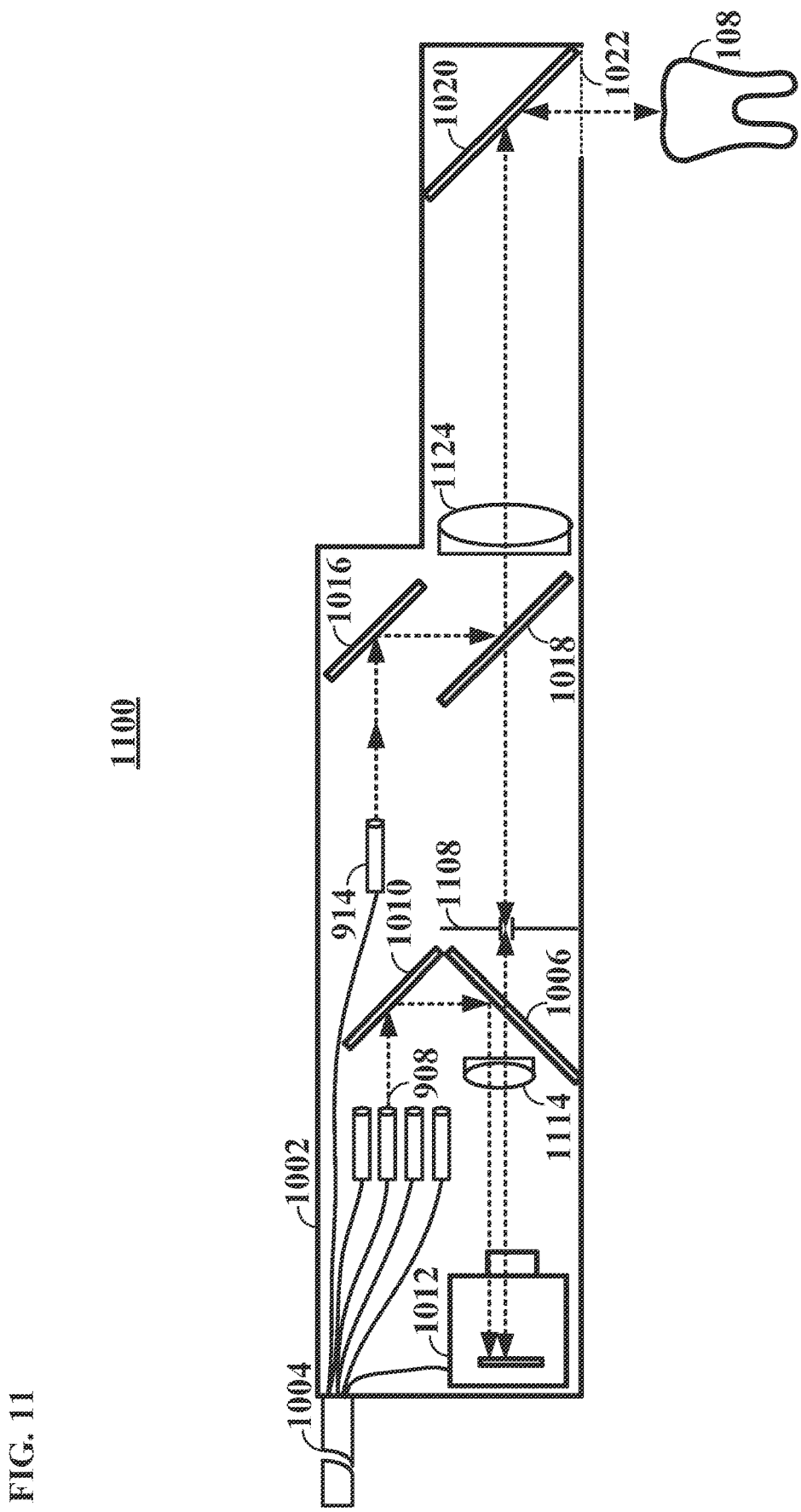
FIG. 11 depicts a second embodiment of a scanning head 1100 of an intra-oral scanner according to this disclosure.

FIG. 11 depicts a second embodiment 1100 of the scanning head of an intra-oral scanner according to this disclosure. This embodiment is similar to that of FIG. 10, with noted exceptions. Unlike the design of FIG. 10, for example, this design may follow the 4f principle, so system distances match the relevant focal lengths.

In this design, a first lens 1114 transmits the reference beams and the radiation scattered from physical object 108. A second lens 1124 transmits the object beam and the radiation scattered from physical object 108. This design is telecentric, i.e., the relevant radiation is substantially coaxially oriented. Such a design has proven better suited for diffuse surfaces. An aperture 1108 may be smaller than aperture 1008 of FIG. 10 but performs a similar function.

The beamsplitters of this design may be of a type chosen to provide particular advantages. Plate beamsplitters have been found to be superior for reducing aberrations, while cube beamsplitters have been found to be superior for reducing ghosting.

Figure 12:
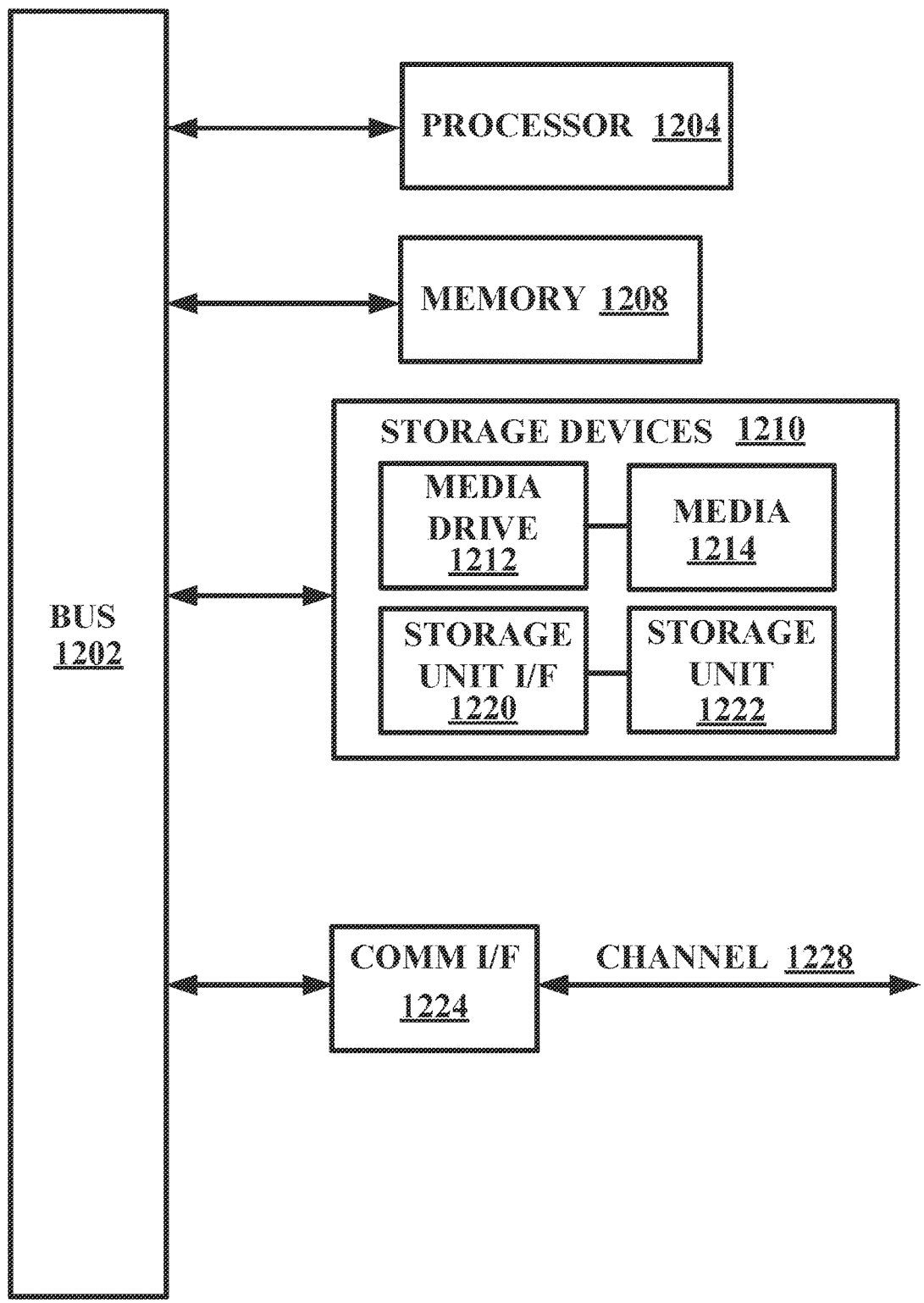
FIG. 12 depicts a computing component 1200 that may carry out the functionality according to this disclosure.

The data encoded on the resulting interference pattern may determine spatial coordinates of points on a three-dimensional surface of physical object 108. The interference pattern may determine the spatial coordinates using wavelengths synthesized from at least one pair of the selected beams used for the holographic imaging. Such use enables reconstruction of the spatial coordinates more precisely over an extended depth range. The surface coordinates may produce a three-dimensional representation of the physical object, such as for manufacturing a dental appliance. Computations for processing the data encoded on the interference pattern may be implemented in a computer program, as a set of program instructions, executable in one or more processors.

Where components or components of the technology are implemented in whole or in part using software, in one embodiment, these software elements can be implemented to operate with a computing or processing component capable of carrying out the functionality described with respect thereto. One such example computing component is shown in FIG. 12. Various embodiments are described in terms of this example computing component 1200. After reading this description, it will become apparent to a person skilled in the relevant art how to implement the technology using other computing components or architectures.

FIG. 12 shows a computing component 1200 that may carry out the functionality described herein, according to an embodiment. Computing component 1200 may represent, for example, computing or processing capabilities found within desktop, laptop and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. Computing component 1200 might also represent computing capabilities embedded within or otherwise available to a given device. For example, a computing component might be found in other electronic devices such as, for example, digital cameras, navigation systems, cellular telephones, portable computing devices, modems, routers, wireless application protocols (WAPs), terminals and other electronic devices that might include some form of processing capability.

Computing component 1200 might include, for example, one or more processors, controllers, control components, or other processing devices, such as a processor 1204. Processor 1204 might be implemented using a special-purpose processing engine such as, for example, a microprocessor, controller, or other control logic. In the illustrated example, processor 1204 is connected to a bus 1202, although any communication medium can be used to facilitate interaction with other components of computing component 1200 or to communicate externally.

Computing component 1200 might also include one or more memory components, simply referred to herein as main memory 1208. For example, random access memory (RAM) or other dynamic memory, might be used for storing information and instructions to be executed by processor 1204. Main memory 1208 might also be used for storing temporary variables or other intermediate information during execution of instructions to be executed by processor 1204. Computing component 1200 might likewise include a read only memory (ROM) or other static storage device coupled to bus 1202 for storing static information and instructions for processor 1204.

The computing component 1200 might also include one or more various forms of information storage mechanism 1210, which might include, for example, a media drive 1212 and a storage unit interface 1220. The media drive 1212 might include a drive or other mechanism to support fixed or removable storage media 1214. For example, a hard disk drive, a floppy disk drive, a magnetic tape drive, an optical disk drive, a compact disc (CD) or digital versatile disc (DVD) drive (read-only or read/write), or other removable or fixed media drive might be provided. Accordingly, storage media 1214 might include, for example, a hard disk, a floppy disk, magnetic tape, cartridge, optical disk, a CD or DVD, or other fixed or removable medium that is read by, written to or accessed by media drive 1212. As these examples illustrate, the storage media 1214 can include a computer usable storage medium having stored therein computer software or data.

In alternative embodiments, information storage mechanism 1210 might include other similar instrumentalities for allowing computer programs or other instructions or data to be loaded into computing component 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory component) and memory slot, a personal computer memory card international association (PCMCIA) slot and card, and other fixed or removable storage units 1222 and interfaces 1220 that allow software and data to be transferred from the storage unit 1222 to computing component 1200.

Computing component 1200 might also include a communications interface 1224. Communications interface 1224 might be used to allow software and data to be transferred between computing component 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1200 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any tune in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Having described the various embodiments, what is claimed is as follows.

The invention claimed is:

1. An apparatus for illuminating at least one physical object for holographic imaging, comprising:
   a single radiation source that emits a spectrum of coherent radiation;
   at least one dispersive element that disperses the spectrum into a plurality of beams of differing wavelengths;
   at least one selection element that selects a plurality of the beams; and
   at least one direction element that directs at least portions of the plurality of selected beams toward the at least one physical object and generates corresponding reference beams,
   wherein the wavelengths of all the beams are mutually variant.

2. The apparatus of claim 1, wherein the single radiation source comprises one of a multi-longitudinal mode laser diode and a single-longitudinal mode laser diode.

3. The apparatus of claim 1, wherein the at least one physical object comprises at least one tooth.

4. The apparatus of claim 1, wherein each reference beam and corresponding selected beam are substantially co-axially aligned.

5. The apparatus of claim 1, further comprising:
   an image sensor that captures an interference pattern from a reference beam and a corresponding superimposed object beam scattered from the at least one physical object.

6. The apparatus of claim 5, wherein the interference pattern yields spatial coordinates of points on a surface of the at least one physical object, and the spatial coordinates yield a three-dimensional representation of the at least one physical object.

7. The apparatus of claim 5, wherein radiation synthesized using at least one pair of the selected beams reconstructs surface data of the at least one physical object over an increased depth range.

8. The apparatus of claim 1, wherein the at least one dispersive element comprises an echelle-type diffraction grating.

9. The apparatus of claim 1, wherein the at least one selection element comprises an optical mask.

10. A method of illuminating at least one physical object for holographic imaging, comprising:
    emitting a spectrum of coherent radiation with a single radiation source;
    dispersing the emitted spectrum into a plurality of beams of differing wavelengths;
    selecting a plurality of the beams; and
    directing at least portions of the plurality of selected beams toward the at least one physical object and generating corresponding reference beams,
    wherein the wavelengths of all the beams are mutually variant.

11. The method of claim 10, wherein the single radiation source comprises one of a multi-longitudinal mode laser diode and a single-longitudinal mode laser diode.

12. The method of claim 10, wherein the at least one physical object comprises at least one tooth.

13. The method of claim 10, wherein each reference beam and corresponding selected beam are substantially co-axially aligned.

14. The method of claim 10, further comprising:
    capturing with an image sensor an interference pattern from a reference beam and a corresponding superimposed object beam scattered from the at least one physical object.

15. The method of claim 14, further comprising:
    determining spatial coordinates of points on a surface of the physical object according to the interference pattern; and
    producing a three-dimensional representation of the at least one physical object using the spatial coordinates.

16. The method of claim 14, further comprising:
synthesizing radiation using at least one pair of the selected beams to reconstruct surface data of the physical object over an increased depth range.

17. The method of claim 10, wherein an echelle-type diffraction grating performs the dispersing.

18. The method of claim 10, wherein an optical mask performs the selecting.

19. A computer program product for illuminating at least one physical object for holographic imaging, comprising a non-transitory computer-readable medium with computer-executable instructions tangibly embodied thereon that, when executed by a processor, perform the steps of:
emitting a spectrum of coherent radiation with a single radiation source;
dispersing the emitted spectrum into a plurality of beams of differing wavelengths;
selecting a plurality of the beams; and
directing at least portions of the plurality of selected beams toward the at least one physical object and generating corresponding reference beams,
wherein the wavelengths of all the beams are mutually variant.

20. A system for illuminating at least one physical object for holographic imaging, comprising:
means for emitting a spectrum of coherent radiation using a single radiation source;
means for dispersing the emitted spectrum into a plurality of beams of differing wavelengths;
means for selecting a plurality of the beams; and
means for directing at least portions of the plurality of selected beams toward the at least one physical object and generating corresponding reference beams,
wherein the wavelengths of all the beams are mutually variant.

21. The system of claim 20, wherein the single radiation source comprises one of a multi-longitudinal mode laser diode and a single-longitudinal mode laser diode.

22. The system of claim 20, wherein the at least one physical object comprises at least one tooth.

23. The system of claim 20, wherein each reference beam and corresponding selected beam are substantially co-axially aligned.

24. The system of claim 20, further comprising:
means for capturing an interference pattern from a reference beam and a corresponding superimposed object beam scattered from the at least one physical object.

25. The system of claim 24, further comprising:
means for determining spatial coordinates of points on a surface of the at least one physical object according to the interference pattern; and
means for producing a three-dimensional representation of the at least one physical object using the spatial coordinates.

26. The system of claim 24, further comprising:
means for synthesizing radiation using at least one pair of the selected beams to reconstruct surface data of the at least one physical object over an increased depth range.

27. The system of claim 20, wherein the means for dispersing comprises an echelle-type diffraction grating.

28. The system of claim 20, wherein the means for selecting comprises an optical mask.

* * * * *